United States Patent [19]

Reynolds

[11] Patent Number: 6,070,305
[45] Date of Patent: Jun. 6, 2000

[54] RELEASABLE RETENTION ASSEMBLY FOR TEMPORARILY RETAINING UTILITY POLE COVERS

[75] Inventor: William E. Reynolds, Centralia, Mo.

[73] Assignee: Hubbell Incorporated, Orange, Conn.

[21] Appl. No.: 09/251,139

[22] Filed: Feb. 16, 1999

[51] Int. Cl.$^7$ .................................................. F16G 11/00
[52] U.S. Cl. ...................................... 24/134 R; 24/132 R
[58] Field of Search .................... 24/135 R, 133, 24/132 R, 115 R, 134 KB, 134 L, 483, 484, 69 R, 68 ST, 71.1, 68 T, 17, 271, 273; 248/63, 61, 65, 67.5, 68.1, 74.1, 219.2, 218.4

[56] References Cited

U.S. PATENT DOCUMENTS

| | | | |
|---|---|---|---|
| 393,952 | 12/1888 | Wodd et al. | 24/132 R |
| 420,962 | 2/1890 | Reimers | 24/134 R |
| 438,291 | 10/1890 | Quitman | 24/132 R |
| 1,250,876 | 12/1917 | Hicks | 24/134 R |
| 1,475,256 | 11/1923 | Belair | 24/134 R X |
| 2,190,661 | 2/1940 | Hauer | 24/132 R X |
| 4,878,270 | 11/1989 | Westerkamp | 24/132 R |

*Primary Examiner*—James R. Brittain
*Assistant Examiner*—Robert J. Sandy
*Attorney, Agent, or Firm*—Jerry M. Presson; Michael R. Swartz

[57] ABSTRACT

A releasable retention assembly includes an elongated flexible member, a retention member and a lock mechanism. The flexible member has opposite end portions and a length sufficient for wrapping at least once about an utility pole to retain a cover in place on the utility pole. The retention member is secured to one opposite end portion of the flexible member and defines a slot through which the other opposite end portion of the flexible member can extend. The lock mechanism includes a latch element mounted to the retention member for undergoing pivotal movement between angularly displaced latched and unlatched positions relative to the other opposite end portion of the flexible member extending through the slot of the retention member. In the latched position the latch element is engaged with and wedges the flexible member within the slot against the retention member to thereby hold the other opposite end portion of the flexible member stationary in relation to the retention member and maintain the flexible member tightened about the utility pole. In the unlatched position the latch element is disengaged from and unwedges the flexible member within the slot to thereby allow the flexible member to loosen about the utility pole. The lock mechanism also includes a spring element biasing the latch element to the latched position and a release lanyard that may be actuated to move the latch element from the latched position to the unlatched position.

19 Claims, 3 Drawing Sheets

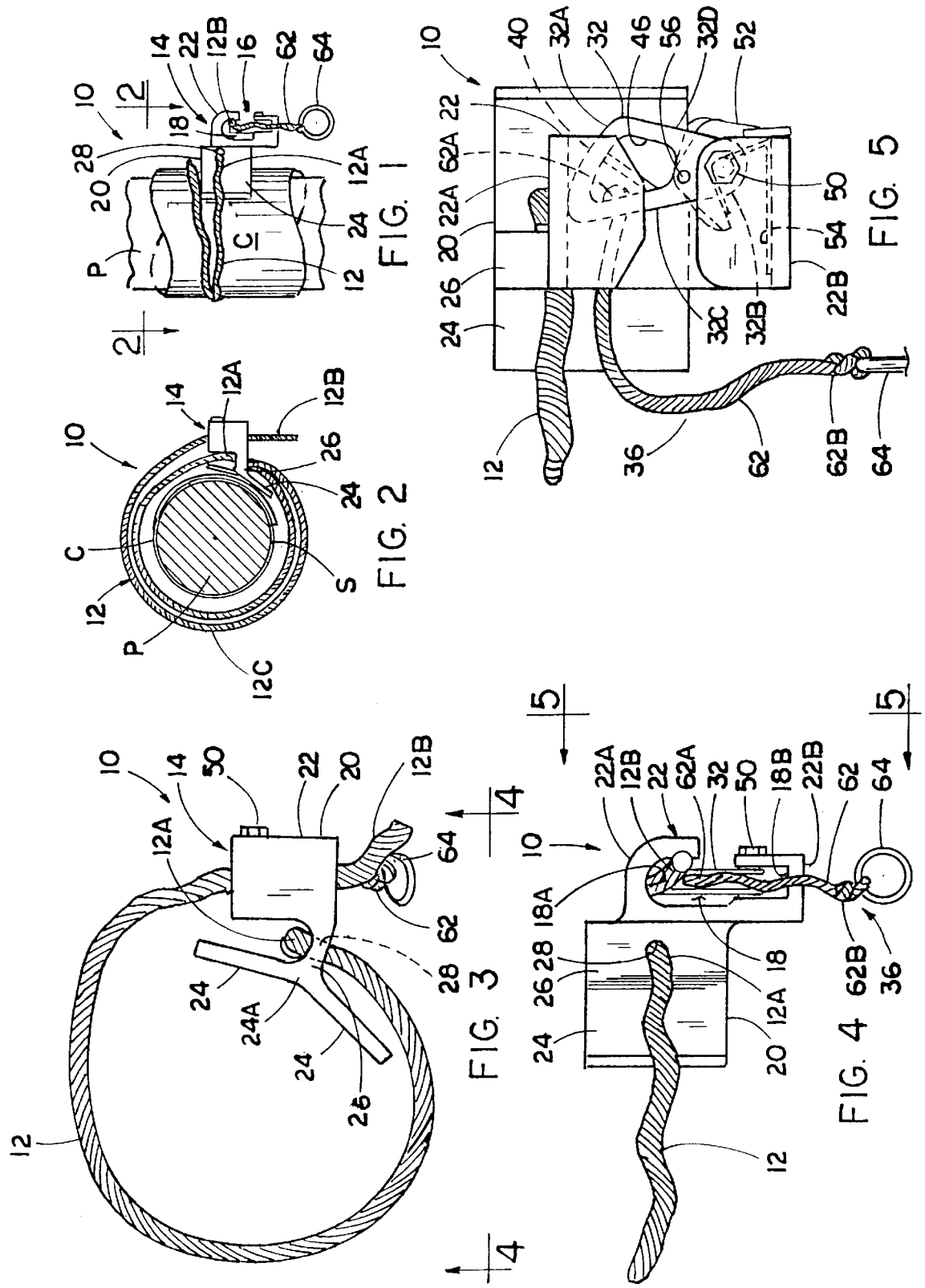

RELEASABLE RETENTION ASSEMBLY FOR TEMPORARILY RETAINING UTILITY POLE COVERS

BACKGROUND OF THE INVENTION

1. Field of the Invention

The present invention generally relates to devices used for retaining covers in place on utility poles and, more particularly, is concerned with a releasable retention assembly adapted for use in temporarily retaining utility pole covers and the like.

2. Description of the Prior Art

A utility pole can conduct electricity. Both a wood pole, due to preservatives in the pole, and a metal pole are electrical conductors. Therefore, personnel installing a utility pole to a working (live) line are susceptible to electrocution. The top of the utility pole should be insulated during installation because the top may come into contact with the working line as the utility pole is raised into place.

Heretofore, covers made of a plastic sheet material which do not conduct electricity have been placed around the top of the utility pole. The cover is typically five to six feet long and rolled into a split tube such that longitudinal edge portions of the tubular cover overlap one another for about one-third of the circumference of the tubular cover. The bottom circumferential edge portion of the tubular cover has buttons or snaps while a top circumferential edge portion of the cover has holes or openings which slip over the buttons of an adjacent cover such that two or three covers may be stacked one above the other to cover a distance of approximately fifteen to eighteen feet of the utility pole.

The tubular cover must be held temporarily in place on the utility pole during the process of installation of the pole and then removed after installation. When a wood utility pole is used, a lineman typically will retain the tubular cover in place by the rather crude technique of sticking a screwdriver into the wood below the bottom edge of the cover. Then, once the utility pole is installed, the workman knocks the screwdriver out and the cover and screwdriver fall from the pole to the ground. However, metal utility poles are used in addition to wood utility poles. The screwdriver technique cannot be used with metal utility poles.

Consequently, a need remains for a device that can be used effectively for retaining an insulating cover on a top of a metal utility pole which overcomes the aforementioned problems associated with a prior art utility pole cover retaining techniques without introducing any new problems in place thereof.

SUMMARY OF THE INVENTION

The present invention provides a releasable retention assembly designed to satisfy the aforementioned need. The releasable retention assembly of the present invention includes an elongated flexible member and a lock mechanism which can be used on wood or steel utility poles. The elongated flexible member is wrapped at least once around the utility pole either on the cover or just below the cover. The elongated flexible member can take the form of a rope, string, cord, tether, chain or any other suitable form which will hold the pole cover about the utility pole with minimal damage caused to the external surface of the pole. The releasable retention assembly can be mounted to and released from the pole without much effort on the part of utility personnel.

Accordingly, the present invention is directed to a releasable retention assembly which comprises: (a) an elongated flexible member having a pair of opposite end portions and a length sufficient for wrapping at least once about a circumference of an utility pole to retain a tubular cover in place on the utility pole; (b) a retention member secured to one of the opposite end portions of the elongated flexible member and defining a slot through which the other of the opposite end portions of the elongated flexible member can extend; and (c) a lock mechanism including (i) a latch element mounted to the retention member for undergoing pivotal movement between a latched position and an unlatched position relative to the other opposite end portion of the elongated flexible member extending through the slot of the retention member, the latch element in the latched position being engaged with and wedging the elongated flexible member within the slot against the retention member to thereby hold the other opposite end portion of the elongated flexible member stationary in relation to the retention member and maintain the elongated flexible member tightened about the utility pole, whereas the latch element in the unlatched position being angularly displaced from the latch element in the latched position and disengaged from and unwedging the elongated flexible member within the slot to thereby allow the elongated flexible member to loosen about the utility pole, and (ii) means for releasing the latch element from the latched position to the unlatched position.

More particularly, the elongated flexible member can be a rope. The retention member includes a bracket adapted to engage a side of the utility pole adjacent to the elongated flexible member wrapped around the utility pole. The bracket also is adapted to receive and secure the one opposite end portion of the elongated flexible member. The retention member further includes a lock housing attached to the bracket and extending outwardly therefrom and defining the slot of the retention member through which the other opposite end portion of the elongated flexible member can extend. The bracket of the retention member has a pole engaging portion and a flange. The pole engaging portion is adapted to engage the side of the utility pole. The flange is attached to the pole engaging portion and extends outwardly therefrom and defines an aperture through which the one opposite end portion of the elongated flexible member extends for securing the elongated flexible member to the flange.

Further, the latch element of the lock mechanism has a cam surface for engaging the elongated flexible member. The latch element of the lock mechanism has means thereon for gripping the elongated flexible member. In one exemplary form, the gripping means is a plurality of teeth defined on the cam surface for gripping the elongated flexible member.

Still further, the releasing means of the lock mechanism can be a release lanyard attached to and actuatable to move the latch element from the latched position to the unlatched position. The release lanyard of the lock mechanism has a free end and an annular ring attached to the free end. The annular ring is engagable by a pole hook or the like handled by a workman for engaging and actuating the release lanyard to move the latch element to the unlatched position and thereby allow the elongated flexible member to loosen about the utility pole.

The lock mechanism also can include means for biasing the latch element toward the latched position. The biasing means includes a spring element mounted to the retention member to undergo movement between an expanded condition in which a biasing force is exerted on the latch element so as to cause the latch element to move to the latched position and a contracted condition in which the biasing force is removed from the latch element so as to permit the latch element to move to the unlatched position. The biasing means also includes a spring release element pivotally mounted to the latch element and disposed between the latch element and the spring element. The spring element in biasing the latch element to the latched position engages the spring release element which, in turn, engages the latch element. The spring release element is pivotally movable manually by a workman against the biasing force of the spring element so as to move the spring element from its expanded condition to its contracted condition which allows the latch element to pivot to the unlatched position and release from the elongated flexible member.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a fragmentary elevational view of an utility pole and tubular cover maintained about the pole by a releasable retention assembly of the present invention.

FIG. 2 is a cross-sectional view of the pole and cover and a top view of the retention assembly deployed about the pole and cover.

FIG. 3 is an enlarged view of the retention assembly of FIG. 2 with the pole and cover omitted.

FIG. 4 is a side elevational view of the retention assembly as seen along line 4—4 of FIG. 3 showing a release lanyard of a lock mechanism of the retention assembly.

FIG. 5 is another side elevational view of the retention assembly as seen along line 5—5 of FIG. 3.

DETAILED DESCRIPTION OF THE INVENTION

Figure 7:
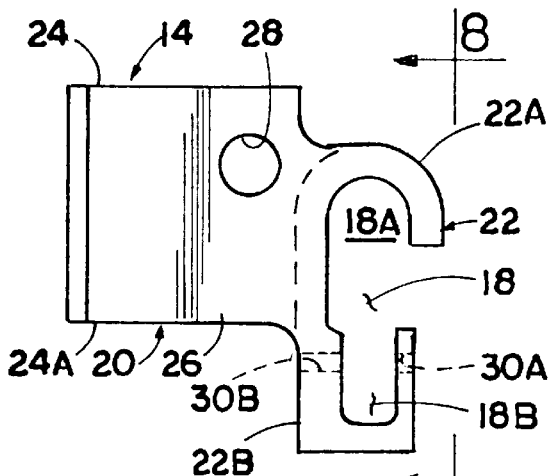
FIG. 7 is a side elevational view of the bracket and lock housing of the retention member as seen along line 7—7 of FIG. 6.
Figure 8:
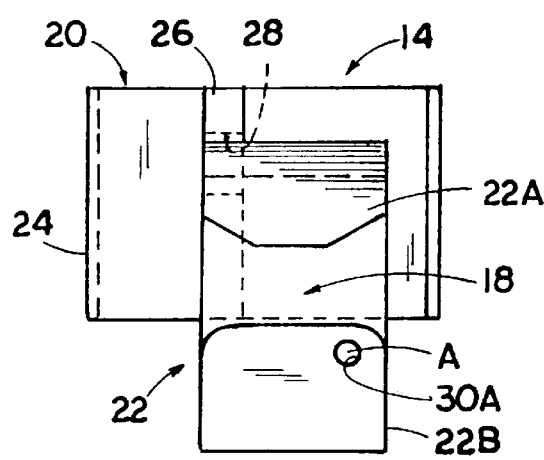
FIG. 8 is a front elevational view of the bracket and lock housing of the retention member as seen along line 8—8 of FIG. 7.
Figure 6:
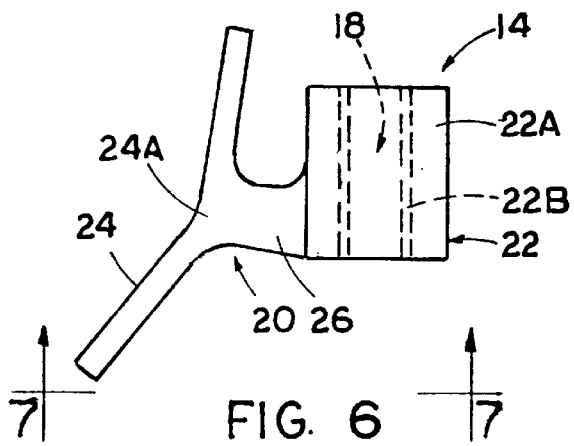
FIG. 6 is a top plan view of a bracket and a lock housing of a retention member of the retention assembly of FIG. 3.
Figure 9:
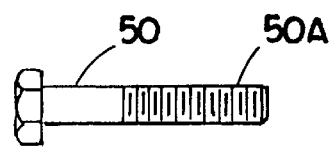
FIG. 9 is a side elevational view of a fastener of the lock mechanism used to pivotally mount the latch element and a spring element of the lock mechanism to the lock housing of the retention member.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Referring to the drawings and particularly to FIGS. 1 to 5, there is illustrated a releasable retention assembly of the present invention, generally designated 10, adapted for use in retaining one or more tubular covers C in place on an utility pole P until it is desired to release and remove the cover C from the utility pole P by actuation of the releasable retention assembly 10. The releasable retention assembly 10 basically includes an elongated flexible member 12, a retention member 14 and a lock mechanism 16.

The elongated flexible member 12 of the assembly 10 has a pair of opposite end portions 12A, 12B and a middle portion 12C extending between the opposite end portions 12A, 12B. The middle portion 12C of the elongated flexible member 12 has a length sufficient for wrapping at least once about the circumference of the utility pole P to retain the tubular cover C in place on the utility pole P. The elongated flexible member 12 can be wrapped on the cover C or just below the cover C. The elongated flexible member 12 preferably is a rope although as mentioned previously it can take any other suitable form. The rope may be of any suitable conventional type. Also, preferably although not necessarily the elongated flexible member 12 is inelastic.

Referring now to FIGS. 1 to 8, the retention member 14 of the assembly 10 is secured to the one opposite end portion 12A of the elongated flexible member 12. The retention member 14 defines a slot 18 through which the other opposite end portion 12B of the elongated flexible member 12 can extend. The retention member 14 includes a bracket 20 and a lock housing 22. The bracket 20 of the retention member 14 is adapted to engage a side S of the utility pole P adjacent to the middle portion 12C of the elongated flexible member 12 that is wrapped around the utility pole P. The bracket 20 also is adapted to receive and secure the one opposite end portion 12A of the elongated flexible member 12.

More particularly, the bracket 20 has a pole engaging portion 24 and a flange 26. The pole engaging portion 24, for example, has a substantially shallow V-shaped configuration adapting it to engage the side S of the utility pole P. The pole engaging portion 24 has a middle section 24A. The flange 26 is attached to the pole engaging portion 24 at the middle section 24A thereof and extends outwardly therefrom. The flange 26 also defines an aperture 28. The one opposite end portion 12A of the elongated flexible member 12 extends through the aperture 28 of the flange 26 and is secured in any suitable manner to the flange 26.

The lock housing 22 of the retention member 14 is attached to the bracket 20 at the flange 26 thereof and extends outwardly therefrom. The lock housing 22 has a substantially C-shaped configuration and defines the slot 18 of the retention member 14 through which the other opposite end portion 12B of the elongated flexible member 12 can extend with the middle portion 12C thereof wrapped about the pole P. An upper portion 22A of the lock housing 22 defining an upper portion 18A of the slot 18 which receives the elongated flexible member 12 has a generally rounded configuration as seen in the end view of FIG. 7. The slot 18 is fully open at the opposite ends of the lock housing 22 and partially open at one side of the lock housing 22 opposite the other side where the lock housing 22 is attached to the flange 26. A lower portion 22B of the lock housing 22 defining a lower portion 18B of the slot has a generally rectangular configuration as seen in the end view of FIG. 7. The lower portion 22B of the lock housing 22 has a pair of mounting holes 30A, 30B defined therethrough at opposite sides of the slot 18 in alignment with one another and open to the slot 18 and to the sides of the lock housing 22. The inner one 30A of the mounting holes 30A, 30B is internally threaded. The bracket 20 and the lock housing 22 can be made of any suitable material, such as aluminum.

Referring now to FIGS. 1 to 5 and 9 to 20, the lock mechanism 16 of the assembly 10 includes a latch element 32, a biasing means 34 and a releasing means 36. The latch element 32 is mounted to the lock housing 22 of the retention member 14 such that the latch element 32 undergoes pivotal movement between a latched position, as shown in solid line for in FIG. 5, and an unlatched position, as shown in dashed line form in FIG. 5, relative to the opposite end portion 12B of the elongated flexible member 12 which extends through the slot 18 of the lock housing 22. The latch element 32 is disposed within the upper and lower portions 18A, 18B of the slot 18 defined by the lock housing 22. The latch element 32 in the latched position is engaged with and wedges the elongated flexible member 12 within the upper portion 18A of the slot 18 against the upper portion 22A of the lock housing 22 to thereby hold the opposite end portion 12B of the elongated flexible member 12 stationary in relation to the lock housing 22 and maintain the elongated flexible member 12 tightened about the utility pole P. The latch element 32 in the unlatched position is angularly displaced from the latch element 32 in the latched position and disengaged from and unwedges the elongated flexible member 12 within the upper portion 18A of the slot 18 and allows the elongated flexible member 12 to loosen about the utility pole P.

Figure 17:
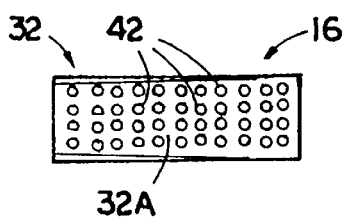
FIG. 17 is a top plan view of the latch element of the lock mechanism as seen along line 17—17 of FIG. 14.
Figure 15:
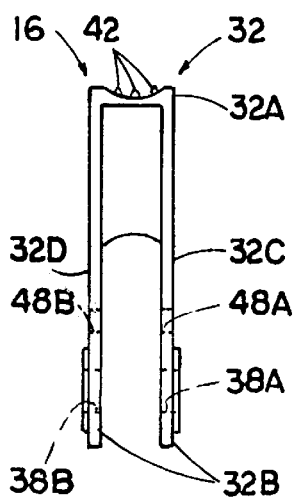
FIG. 15 is an end elevational view of the latch element of the lock mechanism as seen along line 15—15 of FIG. 14.
Figure 14:
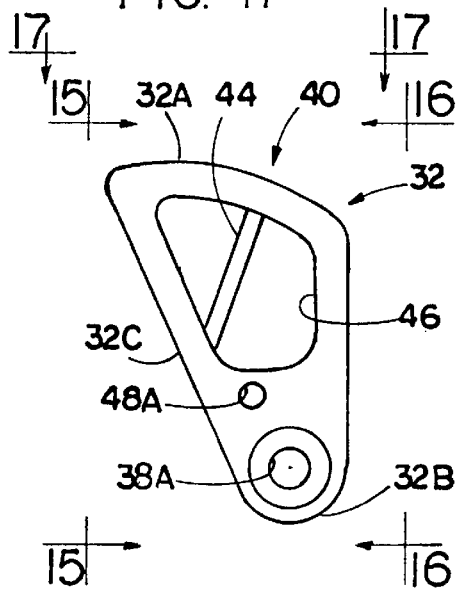
FIG. 14 is a side elevational view of the latch element of the lock mechanism.
Figure 16:
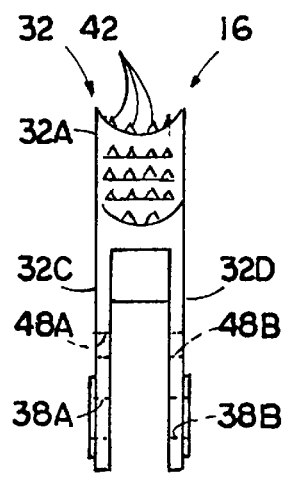
FIG. 16 is an opposite end elevational view of the latch element of the lock mechanism as seen along line 16—16 of FIG. 14.
Figure 18:
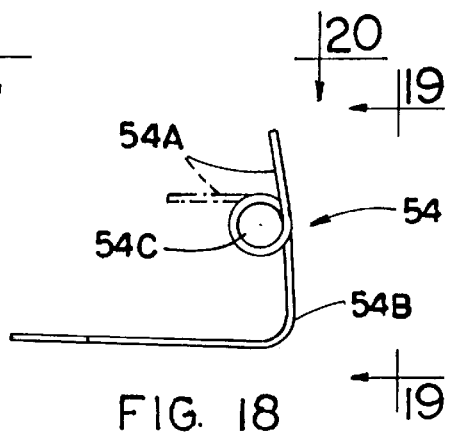
FIG. 18 is a side elevational view of the spring element of the lock mechanism.
Figure 19:
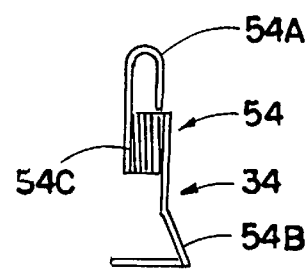
FIG. 19 is an end elevational view of the spring element of the lock mechanism as seen along line 19—19 of FIG. 18.
Figure 20:
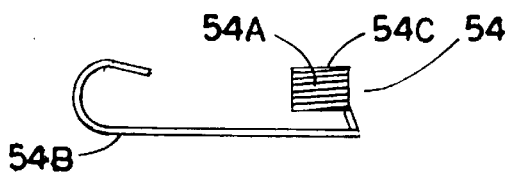
FIG. 20 is a top plan view of the spring element of the lock mechanism as seen along line 20—20 of FIG. 18.

More particularly, the latch element 32 in the side view shown in FIGS. 5 and 14 has a generally triangular-shaped configuration. The latch element 32 has a pair of opposite ends 32A, 32B and a pair of opposite sides 32C, 32D. The one opposite end 32A is rounded whereas at the other opposite end 32B a pair of laterally spaced openings 38A, 38B are formed through the opposite sides 32C, 32D and aligned with one another and concentric about a pivotal axis A of the latch element 32. The length of the one opposite side 32C is greater than the length of the other opposite side 32D such that the one opposite end 32A arcuately tapers toward the other opposite ends 32B in going from the one opposite side 32C to the other opposite side 32D so as to form a cam surface 40 on the one opposite end 32A being arcuate shaped and eccentric relative to the pivotal axis A of the latch element 32. The cam surface 40 is adapted for engaging the elongated flexible member 12 and wedging it against the lock housing 22 as the latch element 32 is pivotally moved in a clockwise direction as viewed in FIG. 5 and disengaging from the elongated flexible member 12 and unwedging it as the latch element 32 is pivotally moved in a counterclockwise direction as viewed in FIG. 5. The latch element 32 has suitable gripping means defined on the cam surface 40, such as a plurality of teeth 42 as shown in FIGS. 15 to 17. The teeth 42 can be aligned in rows. An example of another suitable gripping means might a layer of compressible gripping material, such as rubber, applied on the cam surface 40 in the case where the elongated flexible member 12 is in the form of a chain rather than a rope.

The latch element 32 in the end view shown in FIGS. 15 and 16 has a generally U-shaped configuration with an interior brace portion 44 attached at and extending from the one opposite end 32A and attached to and bridging between the opposite sides 32C, 32D of the latch element 32. The opposite sides 32C, 32D of the latch element 32 have respective central openings 46 therein with respective configurations which substantially resembles the overall triangular side configuration of the latch element 32. The latch element 32 also has a pair of laterally spaced holes 48A, 48B formed through the opposite sides 32C, 32D thereof and aligned with one another. The holes 48A, 48B are disposed between the openings 38A, 38B and the central openings 46. The latch element 32 can be made of any suitable material, such as metal material.

The latch element 32 is pivotally mounted to the lower portion 22B of the lock housing 22 by a fastener 50, such as a bolt. One end 50A of the fastener 50 is externally threaded. The fastener 50 is inserted through the one mounting hole 30A in the lower portion 22B of the lock housing 22, inserted through the pair of openings 38A, 38B in the latch element 32, and threaded into the other mounting hole 30B in the lower portion 22B of the lock housing 22. The latch element 32 is pivotal about the fastener 50 which is concentric with the pivotal axis A and is thereby pivotally mounted to the lock housing 22 of the retention member 14.

Figure 12:
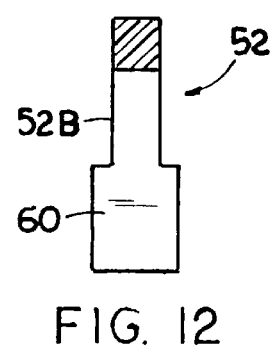
FIG. 12 is a cross-sectional view of the spring release element of the lock mechanism taken along line 12—12 of FIG. 10.
Figure 10:
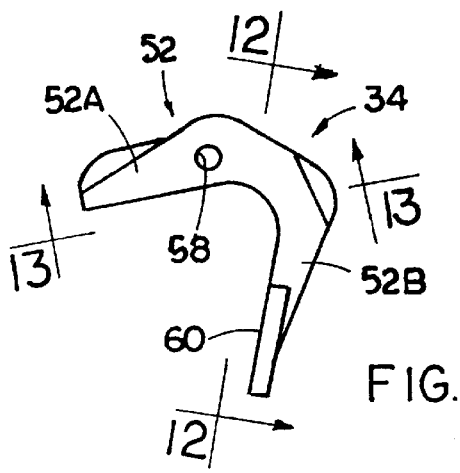
FIG. 10 is a side elevational view of the spring release element of the lock mechanism employed to manually retract the spring element from the latch element of the lock mechanism.
Figure 11:
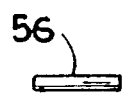
FIG. 11 is a side elevational view of a pin which pivotally mounts the spring release element to the latch element of the lock mechanism.
Figure 13:
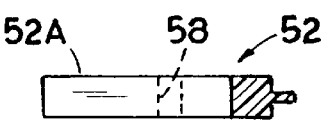
FIG. 13 is another cross-sectional view of the spring release element of the lock mechanism taken along line 13—13 of FIG. 10.

Referring to FIGS. 5, 11 to 13 and 18 to 20, the biasing means 34 of the lock mechanism 16 is provided for biasing the latch element 32 to the above-described latched position, although it is not essential that the biasing means 34 be present in the assembly 10 for the latch element 32 to function properly. The biasing means 34 includes a spring release element 52 and a spring element 54. The spring release element 52 of the biasing means 34 is disposed within the upper and lower portions 18A, 18B of the slot 18 at the upper and lower portions 22A, 22B of the lock housing 22 and also between the opposite sides 32C, 32D of the latch element 32 and below the brace portion 44 thereof. The spring release element 52 is pivotally mounted to the latch element 32 by a mounting pin 56 extending through a hole 58 in the spring release element 52 and the aligned holes 48A, 48B in the opposite sides 32C, 32D of the latch element 32. In such manner, the latch element 32 is mounted for undergoing pivotal movement manner, the latch element 32 is mounted for undergoing pivotal movement between respective retention and release positions relative to the latch element 32 as shown in solid and dashed line forms in FIG. 5. In the retention position the spring release element 52 engages the brace portion 44 of the latch element 32 retaining the latch element 32 at the latched position, whereas in the release position the spring release element 52 is pivoted counterclockwise away from the retention position and from the brace portion 44 of the latch element 32 so as to allow the latch element 32 to pivot to the unlatched position. As seen in FIG. 12 the spring release element 52 has a substantially hook-shaped configuration. The spring release element 52 has a pair of upper and lower leg portion 52A, 52B. The hole 58 which receives the mounting pin 56 is defined through the upper leg portion 52A midway between the opposite ends thereof. The second leg portion 52B has a finger gripping tab 60 thereon of a generally flat and rectangular configuration. The spring release element 52 can be made of any suitable material, such as plastic material.

The spring element 54 of the biasing means 34 is mounted to the fastener 50 and disposed within the lower portion 22B of the lock housing 22 and the opposite sides 32C, 32D of the latch element 32 adjacent to the lower end 32B thereof and below the spring release element 52. The spring element 54 is so mounted to the fastener 50 as to undergo movement between an expanded condition, as seen in solid line form in FIG. 18, and a contracted condition, as seen in dashed line form in FIG. 18. In the expanded condition of the spring element 54, a biasing force is exerted by the spring element 54 on the latch element 32 via the spring release element 52 so as to cause the spring release element 52 to move to the retention position and the latch element 32 to move to the latched position. In the contracted condition of the spring element 54, the biasing force is removed from the latch element 32 via the spring release element 52 so as to permit the spring release element 52 to move to the release position and the latch element 32 to move to the unlatched position. Thus, in biasing the latch element 32 to the latched position, the spring element 54 engages the spring release element 52 which, in turn, engages the latch element 32. By a workman gripping the finger gripping tab 60 thereon, the spring release element 52 is pivotally movable manually by the workman against the biasing force of the spring element 54 so as to move the spring element 54 from its expanded condition to its contracted condition which allows the latch element 32 to be pivoted to the unlatched position and release from the elongated flexible member 12. By way of example, the spring element 54 is in the form of a resilient wire having a pair of opposite end portions 54A, 54B and a coiled middle portion 54C. The coiled middle portion 54C is disposed over and around the fastener 50 and the opposite end portions 54B, 54A of the spring element 54 are captured between the lower portion 22B of the lock housing 22 and the upper leg portion 52A of the spring release element 52.

Referring to FIGS. 1 to 5, the releasing means 36 of the lock mechanism 16 is provided for releasing the latch element 32 from the latched position to the unlatched position. In the illustrated exemplary form, the releasing means 36 includes a release lanyard 62 in the form of a cord or rope attached to the latch element 32 and an annular ring 64 attached to the release lanyard 62. The release lanyard 62 can have any suitable length and has a pair of opposite ends 62A, 62B. The one opposite end 62A of the release lanyard 62 is attached to the latch element 32 while the other opposite end 62B is free. The annular ring 64 is attached to the other opposite free end 62B of the release lanyard 62. The annular ring 64 is adapted to be engagable by a hook (not shown), such as one mounted to an end of a stick or pole, for pulling on and actuating the release lanyard 62 to move the latch element 32 from the latched position to the unlatched position. The annular ring 64 can be made of any suitable material, such as a metal material.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

What is claimed is:

1. A releasable retention assembly, comprising:
    (a) an elongated flexible member having a pair of opposite end portions and a length sufficient for wrapping at least once about a circumference of an utility pole to retain a tubular cover in place on the utility pole;
    (b) a retention member secured to one of said opposite end portions of said elongated flexible member and defining a slot through which the other of said opposite end portions of said elongated flexible member can extend, said retention member including
        (i) a bracket adapted to engage a side of the utility pole adjacent to said elongated flexible member wrapped around the utility pole and adapted to receive and be secured to said one opposite end portion of said elongated flexible member; and
        (ii) a lock housing attached to said bracket and extending outwardly therefrom and defining said slot of said retention member through which said other opposite end portion of said elongated flexible member can extend; and
    (c) a lock mechanism including
        (i) a latch element mounted to said retention member for undergoing pivotal movement between a latched position and an unlatched position relative to said other opposite end portion of said elongated flexible member extending through said slot of said retention member, said latch element in said latched position being engaged with and wedging said elongated flexible member within said slot against said retention member to thereby hold said other opposite end portion of said elongated flexible member stationary in relation to said retention member and maintain said elongated flexible member tightened about the utility pole, whereas said latch element in said unlatched position being angularly displaced from said latch element in said latched position and disengaged from and unwedging said elongated flexible member within said slot to thereby allow said elongated flexible member to loosen about the utility pole, and
        (ii) means for releasing said latch element from said latched position to said unlatched position.

2. The assembly as recited in claim 1, wherein said elongated flexible member is a rope.

3. The assembly as recited in claim 1, wherein said bracket of said retention member has a pole engaging portion and a flange, said pole engaging portion adapted to engage the side of the utility pole, said flange attached to said pole engaging portion and extending outwardly therefrom and defining an aperture through which said one opposite end portion of said elongated flexible member extends for securing said elongated flexible member to said flange.

4. The assembly as recited in claim 1, wherein said latch element of said lock mechanism has a cam surface for engaging said elongated flexible member.

5. The assembly as recited in claim 4, wherein said latch element of said lock mechanism has means defined on said cam surface for gripping said elongated flexible member.

6. The assembly as recited in claim 1, wherein said lock mechanism includes means for biasing said latch element toward said latched position.

7. The assembly as recited in claim 6, wherein said biasing means of said lock mechanism includes a spring element mounted to said retention member to undergo movement between an expanded condition in which a biasing force is exerted on said latch element so as to cause said latch element to move to said latched position and a contracted condition in which said biasing force is removed from said latch element so as to permit said latch element to move to said unlatched position.

8. A releasable retention assembly, comprising:
   (a) an elongated flexible member having a pair of opposite end portions and a length sufficient for wrapping at least once about a circumference of an utility pole to retain a tubular cover in place on the utility pole;
   (b) a retention member secured to one of said opposite end portions of said elongated flexible member and defining a slot through which the other of said opposite end portions of said elongated flexible member can extend; and
   (c) a lock mechanism including
      (i) a latch element mounted to said retention member for undergoing pivotal movement between a latched position and an unlatched position relative to said other opposite end portion of said elongated flexible member extending through said slot of said retention member, said latch element in said latched position being engaged with and wedging said elongated flexible member within said slot against said retention member to thereby hold said other opposite end portion of said elongated flexible member stationary in relation to said retention member and maintain said elongated flexible member tightened about the utility pole, whereas said latch element in said unlatched position being angularly displaced from said latch element in said latched position and disengaged from and unwedging said elongated flexible member within said slot to thereby allow said elongated flexible member to loosen about the utility pole,
      (ii) means for releasing said latch element from said latched position to said unlatched position, and
      (iii) means for biasing said latch element toward said latch position, said biasing means of said lock mechanism including
         a spring element mounted to said retention member to undergo movement between an expanded condition in which a biasing force is exerted on said latch element so as to cause said latch element to move to said latched position and a contracted condition in which said biasing force is removed from said latch element so as to permit said latch element to move to said unlatched position, and
         a spring release element pivotally mounted to said latch element and disposed between said latch element and said spring element, said spring element in biasing said latch element to said latched position engages said spring release element which, in turn, engages said latch element, said spring release element being pivotally movable manually against said biasing force of said spring element so as to move said spring element from said expanded condition to said contracted condition which allows said latch element to pivot to said unlatched position and release from said elongated flexible member.

9. The assembly as recited in claim 1, wherein said releasing means of said lock mechanism is a release lanyard attached to and actuatable to move said latch element from said latched position to said unlatched position.

10. The assembly as recited in claim 9, wherein said release lanyard of said lock mechanism has a free end and an annular ring attached to said free end, said annular ring engagable by a pole hook for actuating said release lanyard.

11. A releasable retention assembly, comprising:
   (a) an elongated flexible member having a pair of opposite end portions and a length sufficient for wrapping at least once about a circumference of an utility pole to retain a tubular cover in place on the utility pole;
   (b) a retention member including
      (i) a bracket adapted to engage a side of the utility pole adjacent to said elongated flexible member wrapped around the utility pole and adapted to receive and be secured to one of said opposite end portions of said elongated flexible member, and
      (ii) a lock housing attached to said bracket and extending outwardly therefrom and defining a slot through which the other of said opposite end portions of said elongated flexible member can extend; and
   (c) a lock mechanism including
      (i) a latch element mounted to said lock housing of said retention member for undergoing pivotal movement between a latched position and an unlatched position relative to said other opposite end portion of said elongated flexible member extending through said slot of said lock housing of said retention member, said latch element having a cam surface thereof for engaging said elongated flexible member and means on said cam surface for gripping said elongated flexible member, said latch element in said latched position being grippingly engaged with and wedging said elongated flexible member within said slot against said lock housing to thereby hold said other opposite end portion of said elongated flexible member stationary in relation to said lock housing and maintain said elongated flexible member tightened about the utility pole, whereas said latch element in said unlatched position being angularly displaced from said latch element in said latched position and disengaged from and unwedging said elongated flexible member within said slot to thereby allow said elongated flexible member to loosen about the utility pole, and
      (ii) means for releasing said latch element from said latched position to said unlatched position.

12. The assembly as recited in claim 11, wherein said elongated flexible member is a rope.

13. The assembly as recited in claim 11, wherein said bracket of said retention member has a pole engaging portion and a flange, said pole engaging portion adapted to engage the side of the utility pole, said flange attached to said pole engaging portion and extending outwardly therefrom and defining an aperture through which said one opposite end portion of said elongated flexible member extends for securing said elongated flexible member to said flange.

14. The assembly as recited in claim 11, wherein said gripping means is a plurality of teeth defined on said cam surface for gripping said elongated flexible member.

15. The assembly as recited in claim 11, wherein said lock mechanism includes means for biasing said latch element toward said latched position.

16. The assembly as recited in claim 15, wherein said biasing means of said lock mechanism includes a spring element mounted to said retention member to undergo movement between an expanded condition in which a biasing force is exerted on said latch element so as to cause said latch element to move to said latched position and a contracted condition in which said biasing force is removed from said latch element so as to permit said latch element to move to said unlatched position.

17. The assembly as recited in claim 16, wherein said biasing means of said lock mechanism further includes a spring release element pivotally mounted to said latch element and disposed between said latch element and said spring element, said spring element in biasing said latch element to said latched position engages said spring release element which, in turn, engages said latch element, said spring release element being pivotally movable manually against said biasing force of said spring element so as to move said spring element from said expanded condition to said contracted condition which allows said latch element to pivot to said unlatched position and release from said elongated flexible member.

18. The assembly as recited in claim 11, wherein said releasing means of said lock mechanism is a release lanyard attached to and actuatable to move said latch element from said latched position to said unlatched position.

19. The assembly as recited in claim 18, wherein said release lanyard of said lock mechanism has a free end and an annular ring attached to said free end, said annular ring engagable by a pole hook for actuating said release lanyard.

* * * * *